May 2, 1944. A. J. SMITH 2,347,974
APPARATUS FOR INTRODUCING FLUIDS INTO CONTAINERS
Filed Nov. 4, 1940
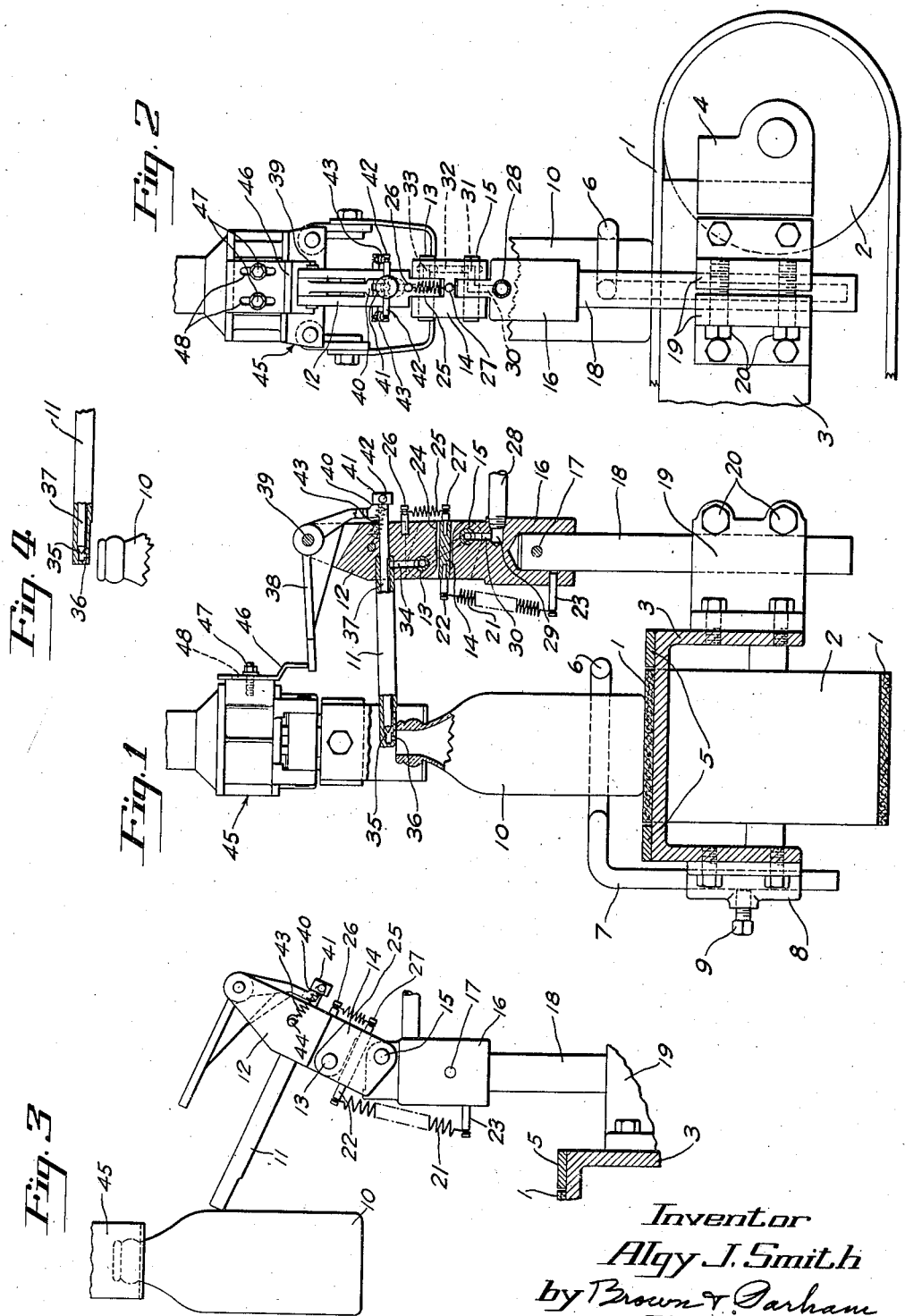

Patented May 2, 1944

2,347,974

UNITED STATES PATENT OFFICE 2,347,974

APPARATUS FOR INTRODUCING FLUIDS INTO CONTAINERS

Algy J. Smith, Hartford, Conn., assignor to Hartford-Empire Company, Hartford, Conn., a corporation of Delaware Application November 4, 1940, Serial No. 364,183

11 Claims. (Cl. 226—99)

This invention relates to apparatus for introducing a fluid into the interior of a container and more particularly for introducing a very small amount of some treating fluid into the interior of a glass container for the purpose of treating the interior of this container to render it more durable chemically against the action of such contents as may subsequently be introduced into the container in its normal use.

It has been found that glass containers, particularly those used for aqueous liquid or semi-liquid materials, are subject to a certain amount of attack of the interior surfaces or that the material adhering to or formed in or on these surfaces are attacked by the aqueous contents of such containers. This has sometimes resulted in undesirably affecting the flavor or taste of the contents and also the appearance of the containers. One explanation of this difficulty is that it is due to the presence on the interior surfaces of such containers of a certain amount of alkali, which may subsequently be dissolved off or leached out by the contents of the container. Sometimes this has further resulted in the presence within the container, and within the contents thereof, of flaky material, which is either silica or of a silicious nature and which has the appearance of a sediment in a transparent liquid material, such as may be contained within the container, as for example, certain beverage liquids.

Various treating materials have been proposed by the prior art, both solid and gaseous in nature, including, for example, common acid gases known in the art. It has also been proposed to use certain liquids in treating the interior of containers, including organic liquids of particular kinds. The particular chemical fluid material which is introduced into a container for the treatment thereof is, however, no part of the present invention and will not be further discussed herein.

The present invention is restricted to apparatus by which some fluid, either a liquid or a gas, may be introduced into the interior of a container. Furthermore, while the apparatus disclosed herein is particularly advantageous for use in introducing a fluid material for treating the interior of a glass container, the present invention is not limited to the introduction of a treating fluid into a container, but may advantageously be used for introducing a part or all the desired contents into a container in the filling thereof. Furthermore, the present invention is not limited to use with glass containers, as it is contemplated that containers made of other materials may be filled partly or wholly by fluid introduced thereinto by the use of apparatus in accordance with the present invention.

Among the objects of the present invention are to provide apparatus of the character described, wherein a container is placed automatically or by hand at a predetermined position, whereupon the fluid introducing means of this invention comes into action. The present invention provides an arrangement whereby, if a container is not suitably located at a predetermined position at which it is to be supplied with a fluid, the fluid supplying means will not be operative to supply the fluid. Thus, the present invention prevents the wasting of fluid when a container is not at the desired filling position.

A more specific object of the present invention is to provide a laterally disposed arm which has a normal position somewhat above the predetermined or filling position for a container, so that a container may freely be placed beneath it in some suitable manner, preferably automatically. This arm is then moved downwardly into engagement with the upper end of a container and is provided with a passage through which the fluid is introduced into the container. In the event that a container is in the desired filling position, then upon contact between the arm and the upper portion of the container, and not until such contact, a valve is opened, preferably by the same means which depresses the arm into contact with the container to introduce the fluid into the container. In the specific embodiment of the invention hereinafter disclosed, the action of depressing this arm and the subsequent opening of the valve is effected by the downward movement of a container handling means, specifically tongs, by which the container is later moved from the filling position to some suitable delivery position by a movement, the initial part of which is substantially vertical and upward from the filling position.

A further object of the invention when operating with container handling means for moving containers vertically upwardly away from the filling position once they have been supplied with a desired amount of fluid, is to provide suitable mounting for the filling means, specifically the laterally extending filling arm, whereby the article is permitted to move as aforesaid without interference by the filling means.

Other and more detailed objects of the present invention will become apparent from the following description of one specific embodiment thereof and from the appended claims when taken in conjunction with the accompanying drawing, in which:

Figure 1 is a view, principally in elevation, but with certain parts broken away and in central vertical section, illustrating apparatus for introducing a fluid into a glass container;

Fig. 2 is a fragmentary elevational view, as seen from the right in Fig. 1;

Fig. 3 is a fragmentary view similar to Fig. 1, but with the parts principally in elevation, showing the operation of the several parts during the removal of a container from the filling position; and Fig. 4 is a fragmentary view partly in elevation and partly in vertical section illustrating the normal position of the filling means as a container is moved thereunder and before the filling means comes into contact with the container.

There is shown in the accompanying drawings an apparatus for the automatic handling of hot glass bottles, including a buck or conveyor by which these bottles are brought, presumably from a bottle forming machine, to a predetermined position. At that predetermined position, which may be termed a filling position, as some fluid is introduced into the articles in the containers at this point, they are maintained for a sufficient period of time to permit the introduction of a desired amount of fluid. When treating glass bottles with a liquid treating material to improve the durability of the interior surface, the amount of fluid introduced may be in the order of magnitude of 0.2 cc. per pint of contents of the container treated. The present invention is, however, not limited to the introduction of such small amounts of fluid into each container, but is intended to include the introduction of any desired amount of fluid, up to and including an amount necessary to fill the container.

After the filling operation, or fluid introducing operation, as it may be termed, has been completed, the container is preferably removed from the filling position to a desired delivery point, which in the case of hot glass bottles may be the belt of a conventional glassware annealing lehr.

Provision is made for preventing the flow of fluid through the fluid-introducing means in the event that a container is not at the desired filling position at the time the apparatus is normally operated. Provision is also made permitting the substantially vertical upward movement of containers in moving them from the filling position toward their delivery point, whatever that point may be.

Turning now to the apparatus as shown in the accompanying drawing, there is illustrated an endless buck or conveyor 1. This conveyor is trained around two or more rolls, one of which is shown at 2. The active or ware-bearing strand of the conveyor 1 is supported on the upper surface of a channel member 3, which may be supported in any suitable manner, not shown. At one end the channel member 3 carries brackets 4 in which the roll 2 is suitably journaled. The active or ware-bearing strand of the conveyor 1 may be guided on the upper surface of the channel member 3 by a pair of guide strips 5, Fig. 1.

Means are provided for predetermining the filling position of a container upon the conveyor 1, such means in the present instance comprising a rod or stop member 6 having a curved portion against which the containers are brought by the movement of the conveyor 1. The conveyor 1 may be moved continuously or intermittently, as desired, in accordance with the type of drive provided therefor. This drive is not disclosed herein as it may be of any conventional type. The rod or stop member 6 is provided with a downwardly extending stem portion 7, which is vertically adjustably received within a sleeve-like bracket 8 secured to one of the vertically disposed walls of the channel member 3. The vertical adjustment of the stop member 6 may be secured by a suitable set screw 9 threaded into the bracket member 8 and bearing upon the depending portion 7 of the member 6.

While there is disclosed and described an automatic means particularly comprising the conveyor 1 for bringing containers, such as that shown at 10, to a predetermined filling position, it is contemplated that containers may be brought to and/or placed at a desired predetermined filling position by any suitable means, including manual means, the means shown being for purposes of illustration as a portion of a commercial type, operating mechanism such as would be employed in a modern glass factory.

Means are provided for introducing a fluid into a container at the predetermined filling position as aforesaid. Such means in the present instance comprises a laterally extending arm 11, which is suitably rigidly secured in an arm carrying member 12. The member 12 is pivotally connected by a hollow pintle 13 to an intermediate link member 14, which in turn is pivotally connected by a hollow pintle 15 to a stationary supporting member 16. The supporting member 16 is suitably rigidly secured, as by a pin 17, to the upper end of a vertical shaft 18, which is in turn vertically adjustably secured in a pair of brackets 19, the brackets 19 being rigidly secured to one lateral side or web of the channel member 3. The shaft 18 may be secured after adjustment in the brackets 19 by tightening a pair of bolts 20 passing through one of these brackets and threaded into the other, Figs. 1 and 2.

The vertical adjustment between the shaft 18 and the brackets 19 for vertically adjusting the normal or intermediate position of the arm 11, shown in Fig. 4, serve to compensate for different heights of different containers, which may be handled by the apparatus of this invention.

The normal or intermediate position of the arm 11 is predetermined by resilient means, in the present instance springs, and stop means intermediate the members 12 and 14 on the one hand, and members 14 and 16, on the other hand. As shown in Figs. 1 and 2, the member 14 is resiliently held at a position which may be considered as substantially vertically aligned with the member 16 by being urged to move counterclockwise about the pintle 15 by a tension spring 21 extending between an anchorage pin 22 secured to the member 14 and an anchorage pin 23 secured to the member 16.

When the member 12 is in a position which may be considered as substantially aligned with the member 14, a stop portion shown at 24, Fig. 1, is in engagement with an intermediate web portion of the member 14 opposite it. These parts are not shown in engagement in the sectioned portion of Fig. 1. They are, however, urged into engagement by a tension spring 25 extending between an anchorage pin 26 secured in the member 12 and anchorage pin 27 secured in the web portion of the member 14, Fig. 1. The position of the parts shown in Fig. 1 is one resulting from the downward movement of the arm 11 into contact with the upper portion of a container 10 tensing the spring 25 and causing a certain amount of relative rotation between the parts 12 and 14 about the axis of the pintle 13.

The other position of the arm 11 and certain associated parts, including the members 12 and 14, is reached by a simultaneous rotation of these parts about the axis of the pintle 15 against the tension of the spring 21. This position is shown in Fig. 3 and is that assumed by the parts upon the upward movement of a container 10, as shown in that figure. This upward movement operating through contact between the container and the end of the arm 11, as shown, causes the parts 11, 12 and 14 to rotate about the axis of the pintle 15 in a clockwise direction, as seen in Fig. 3, against the tension of the spring 21. Thus, these parts are so constructed and arranged as to permit of the vertical upward removal of a container from the predetermined or filling position thereof.

Means are provided for supplying a fluid to and through the arm 11 to the interior of a container at the predetermined filling position for a container, shown in Fig. 1. For this purpose, a suitable fluid to be introduced into the container is supplied to the device through a pipe 28, which is threaded into a suitable bore 29 in the member 16. The bore 29 communicates through a substantially vertically disposed bore 30 with a hollow portion 31 of the pintle 15. The pintle 15 is preferably so arranged that this hollow portion 31 will always be in communication with the bore 30. This may be effected by preventing relative rotation between the pintle 15 and the member 16 in any suitable conventional manner. The hollow portion 31 in the pintle 15 communicates with an inclined bore or passage 32 in the member 14. This bore or passage preferably terminates in an annular groove surrounding the pintle 15 so as always to be in communication with the hollow portion 31 thereof. The bore or passage 32 terminates at its upper end in an annular groove surrounding the pintle 13 so as constantly to communicate with the hollow portion of that pintle indicated in dotted lines at 33. Thus, while the pintles 15 and 13 may be maintained non-rotatable in respect to the members 16 and 12 respectively, communication is always maintained for fluid through the pintles and through the member 14. The hollow portion 33 of the pintle 13 communicates with a bore 34, Fig. 1, in the member 12, which in turn communicates through a lateral opening shown in Fig. 1 with a longitudinal bore within the arm 11. Adjacent to the outer end of this longitudinal bore and within the arm 11 is formed a valve seat shown at 35. Beyond the valve seat the bore within the arm 11 is of smaller diameter and communicates with a laterally and downwardly opening port or orifice 36 through which the fluid may be injected downwardly into the interior of a container, as shown in Fig. 1.

Extending through the arm 11 is a valve rod 37, which may be provided with a longitudinal groove or flattened portion to permit the flow of fluid past this stem up to the valve seat. The inner end of the valve rod 37 is formed tapered, as shown, and is arranged to seat in fluid-tight relation on the valve seat 35. Thus, with the parts in the position shown in Fig. 4, no fluid may flow through the bore of the arm 11 and out through the port or orifice 36. When it is desired to supply fluid through the arm 11, the valve stem 37 is retracted or moved to the right, as seen in Figs. 1 and 4, by suitable means hereinafter to be described, thus permitting a flow of fluid through the arm 11 to the interior of a container 10.

While the construction particularly illustrated in the accompanying drawings is intended for the supplying of very small amounts of a liquid material to the interior of a container, it will be understood that any suitable means, generally equivalent to the construction shown, but adapted for the supplying of any fluid in any desired larger amounts or at desired higher rates may be used, in accordance with the purposes for which the device is to be put. For example, if it were desired to fill a relatively large amount of a fluid into a container, the passages for the fluid and the valve would be suitably increased in size and possibly also redesigned, as well known in the art, in order to provide for such desired larger flow in a reasonable time.

Means are provided for controlling the operation of the valve, which in turn controls the flow of fluid through the arm 11, these means being so constructed and arranged that fluid will not be supplied through the orifice 36 unless a container is at the predetermined filling position, as shown in Fig. 1, to receive such fluid. In order to achieve this purpose, the operating means are so constructed and arranged that the valve may not be opened until the arm 11 has engaged the upper portion of a container and further counterclockwise movement of this arm about the axis of the pintle 13 has been stopped by this engagement.

In order to effect these results, a bell crank lever 38 is pivotally mounted in the upper end of the member 12, as shown at 39. Suitable means, hereinafter described, may be employed for actuating the lever 38. The lower or right-hand end of the lever 38, as seen in Fig. 1, is bifurcated, as shown at 40, to engage behind an enlarged head 41 formed upon or suitably secured to the outer end of the valve stem 37. The head 41 is also provided with one or a pair of transversely extending pins, as shown at 42, two being shown in the accompanying drawings. The ends of the pins 42 are connected through tension springs 43 with suitable anchorage pins 44, Fig. 3, secured in the member 12. The springs 43 are intentionally made substantially heavier than is the spring 25; that is, the total effect of the two springs 43 requires a greater force to move the head 41 and the valve stem 37 than is required to extend the single spring 25 in the construction particularly illustrated. Thus, when the lever 38 is moved in a counterclockwise direction about its pivotal point 39, Fig. 1, the valve stem will not be moved in respect to the arm 11 until this arm has come to rest upon the upper portion of a container, the spring 25 extending meanwhile and the arm 11 being moved from the position shown in Fig. 4 to that shown in Fig. 1 by a movement in respect to the members 14 and 16 and about the axis of the pintle 13. Continued movement of the lever 38 will thereafter be effective to open the valve at the valve seat 35 by movement of the valve stem 37 to the right, as seen in Figs. 1 and 4, against the tension of the springs 43.

Thus, if a container is not at the position to be filled, the arm 11 will continue to be moved downwardly against the tension of the spring 25 beyond the position shown in Fig. 1, the springs 43 maintaining the valve closed. If, however, a container is in the position shown in Fig. 1, then continued movement of the lever 38 will be effective to open the valve to admit fluid through the arm 11 to the interior of a container at the filling position.

While various types of apparatus, automatic or manual, could be employed for actuating the lever 38 as aforesaid, it is contemplated that this lever and the operations performed thereby be operated automatically, preferably by the tongs or warehandling means by which the container is later to be removed from the filling position. In the accompanying drawing, there is illustrated tongs generally indicated at 45, these tongs from the point of view of the present invention being conventional. When the present invention is employed specifically as aforesaid in the treating of the hot glass articles between the forming machine and the lehr, these tongs may take the form of stacker tongs of the type shown in Lorenz Patent No. 1,878,156, issued September 20, 1932. This is a device for picking up glass articles at a single predetermined point and placing them in suitable arrangement in a plurality of rows upon the conveyor belt of a glassware annealing lehr. This device is known commercially as the Hartford-Empire Stacker, many of which are in actual operation throughout the country.

As shown, the tongs may be provided with an actuating arm 46, which is preferably vertically adjustably secured thereto, as by bolts 47 passing through vertically elongated slots 48 formed in the arm 46. Thus, the actuating member 46 may be suitably adjusted in respect to the tongs so as to actuate the lever 38 to a desired extent upon the downward movement of the tongs to grasp an article at the filling position.

When the apparatus of the present invention is applied to the handling of glass bottles which are to be treated as aforesaid for increasing the durability of their interior surfaces, but a very small amount of a fluid is to be inserted into the inside. For this reason, the tongs may merely move down to a sufficient extent to grasp the bottle, there being time enough during the normal period of movement of the tongs to grasp the article and to permit the introduction of a sufficent amount of fluid into the container. It will be understood, however, that the amount of fluid introduced will be determined by the character of the fluid itself (viscosity, etc.), as well as by the dimensions of the passages through which the fluid flows, the setting of the member 46 which determines the amount of opening of the valve, and by the time period that the tongs are at their lowermost position during which the valve in the arm 11 remains open. All these things are matters of practice and can be determined in any suitable manner by those skilled in the art, in accordance with the amount of fluid desired in each container. It will be understood that in the event that a device such as the Hartford-Empire stacker shown in the Lorenz patent aforesaid is used, there will, of course, be two tongs operating alternately in picking up containers at the predetermined or filling point and moving them in curved paths, the initial portions of which are vertical, to positions on the conveyor belt of the glassware annealing lehr. When using such a device, both tongs will, of course, be provided with actuating means, such as the member 46 shown.

An intermediate position in the removal of an article is illustrated in Fig. 3. In moving from the Fig. 1 position to the Fig. 3 position, the first result of the substantially vertical movement of the tongs will depend upon the relative dimensions of the parts; that is, if there is sufficient clearance between the gripping portions of the tongs and the finish or enlarged portion of the neck of a bottle gripped thereby, the initial part of the upward movement of the tongs will be sufficient to permit the closing of the valve by the springs 43. On the other hand, if there is no clearance, substantially the condition shown in the drawing, then both the arm 11 and the lever 38 may move together until the portion 24 of the member 12 engages the web of the member 14 before the valve has closed. Thereafter, the valve will be closed upon the release of the lever 38 by the actuating member 46 under the continued upward movement of the tongs and the container held thereby. The container itself may be employed, as shown in the accompanying drawing, as the means for moving the arm 11 out of the way to permit the vertical movement of the container, this action being permitted by rotation of the member 14 and parts carried thereby about the axis of the pintle 15 against the tension of the spring 21. This is the condition of the parts shown in Fig. 3.

While there is shown and described herein but one specific embodiment of the invention, it is contemplated that various changes may be made therein some of which are suggested herein, and which are within the scope of the appended claims, which are to be construed as broadly as the state of the prior art permits.

I claim:

1. Apparatus for introducing a fluid into the interior of a container, comprising means for moving a container substantially horizontally to a predetermined position, means located adjacent to said predetermined position for supplying a fluid to the interior of a container through the open upper end thereof while it is at said position, means for supporting the last-named means in a position with a portion at least thereof above said container while at said predetermined position, means for moving said container from said predetermined position to a delivery point in a path having an initial portion substantially vertical, so that said container is moved from said predetermined position in a substantially vertical direction, and means mounting said fluid supplying means so that it may be moved upon the vertical movement of said container to permit such vertical movement.

2. Apparatus for introducing a fluid into the interior of a container, comprising a conveyor for moving a container laterally to a predetermined position, means for positioning a container at said predetermined position while permitting continued movement of said conveyor, a laterally extending arm provided with a through passage for the supplying of a fluid to the interior of a container at said predetermined position, tongs for removing a container from said predetermined position by an initial, substantially vertical, upward movement, a support for said arm, a substantially horizontal axis pivotal connection between said arm and said support, resilient means for holding said arm at a position over and adjacent to the upper portion of a container at said predetermined position, said arm and its mounting being so constructed and arranged that upon the upward movement of a container by said tongs, the container will engage said arm and cause it to move about its pivot in respect to said support against the action of said resilient means, permitting the movement of the container from said predetermined position by said tongs as aforesaid.

3. Apparatus for introducing a fluid into the interior of a container, comprising a substantially horizontally disposed belt conveyor, a stop for predetermining the position of a container moved by said belt conveyor at a predetermined position, supporting means adjacent to the path of said conveyor and adjacent to said predetermined position, an arm articulated to said supporting means and so constructed and arranged as normally to be positioned at an intermediate position in alignment with and spaced slightly above the upper end of a container at said predetermined position, resilient means for holding said arm at its normal or intermediate position, a passage through said arm for fluid to be introduced into said container, a valve controlling the flow of fluid through said passage, tongs for removing a container from said predetermined position by a substantially vertical upward movement, and means in part carried by said tongs and so constructed and arranged as first to move said arm downwardly to a position in engagement with the upper end of a container at said predetermined position, and thereafter operable to open said valve to admit fluid to the interior of a container through said arm, the articulated connection between said arm and said supporting means being so constructed and arranged that upon the upward movement of said arm by said tongs, said arm will be moved in respect to said supporting means so as to permit the vertical removal of a container from said predetermined position.

4. Apparatus for introducing a fluid into the interior of a container, comprising a substantially horizontally disposed belt conveyor for transporting a container laterally to a predetermined position, a stop associated with said conveyor for stopping the lateral movement of a container at said predetermined position while permitting continued movement of said belt conveyor, a support located adjacent to said conveyor at said predetermined position, a shaft vertically adjustably arranged in respect to said support at said predetermined position, a laterally disposed arm having an intermediate position slightly above the upper end of a container at said predetermined position, a lower position in engagement with the upper end of the container at such position and an upper position such as to permit the vertical movement of the container past said arm in removing it from from said predetermined position, an intermediate link connecting said arm and said shaft, resilient means tending to hold said arm at its intermediate position, tongs for removing a container from said predetermined position in a substantially vertical upward direction, a bell crank lever arranged for pivotal movement in respect to said arm, and a spring-closed valve in said arm for controlling the flow of a fluid through said arm, and means carried by said tongs for actuating said bell crank lever first to move said arm from its intermediate position to said position in contact with the upper end of a container at said predetermined position, and thereafter to open said valve.

5. In apparatus for introducing a fluid into the interior of a container having an open upper end, the combination with means for supporting such a container at a filling position, of a stationary supporting member adjacent to and at one side of said filling position, an arm, a carrying member supporting said arm at one end of the latter, means constructed and arranged to pivotally connect said carrying member with and to support it above said stationary supporting member so that said arm projects laterally from the carrying member over the container at said filling position and so that said carrying member may be tilted toward said container from a position substantially vertically aligned with the stationary supporting member to move said arm downwardly from a higher level to a position to rest with its outer end portion upon the open upper end of the container, means to tilt said carrying member to effect said movement of the arm, said arm having a longitudinally extending fluid conducting passage therein terminating in a downwardly opening fluid discharge orifice in its said outer end portion, means for supplying fluid to said passage, means for controlling discharge of fluid from said discharge orifice, and spring means tending to maintain said carrying member in the position at which it is substantially vertically aligned with said stationary supporting member.

6. Apparatus in accordance with claim 5 in which the means for connecting said carrying member with and supporting it above said stationary supporting member is further constructed and arranged that said carrying member may also be tilted from its substantially vertically aligned relation with said stationary supporting member in a direction away from said container.

7. Apparatus in accordance with claim 5, comprising in addition means for vertically adjusting the position of said stationary supporting member in relation to the means for supporting a container at said filling position.

8. Apparatus for introducing a fluid into the interior of a container having an open upper end, comprising means for supporting such container in an upright position at a predetermined filling position, means for supplying a fluid to the interior of such a container through the open upper end thereof when the container is at said predetermined filling position, said means including a pivotally mounted discharge member having a discharge end portion located directly over the open upper end of said container when the latter is at its said filling position, vertically movable tongs for engaging the container at the filling position and for then moving the container upwardly from its said supporting means in a substantially vertical direction from said filling position and means adjacent to and at one side of said filling position for pivotally mounting said discharge member, said last-named means being so constructed and arranged that the discharge end portion of said movably mounted fluid discharge member will be swung upwardly by said container out of the path of substantially vertical movement of said container as the latter is moved upwardly from its filling position.

9. Apparatus for introducing a fluid into the interior of a container, comprising means to support a container at a predetermined position, a nozzle-carrying arm mounted for movement adjacent to said predetermined position so that said arm in one position of its movement will engage the upper portion of a container at said position, a valve in said arm controlling the flow of fluid therethrough, and actuating means mounted for movement with and in respect to said arm and arranged by its movement to move said arm and also to open said valve by movement in respect to said arm, resilient means preventing the opening of said valve until said arm has been moved into engagement with a container at said position, and means for operating the said actuating means first for moving said arm to a position to engage a container at said position and thereafter, against said resilient means, to open said valve to admit fluid into the interior of a container at said position, whereby in the event a container is not at said position when said arm is actuated, said valve will not be opened to supply fluid through said arm, said means for operating the said actuating means comprising tongs for moving containers from said predetermined position to a delivery point, a member movable with said tongs for engaging said actuating means and so constructed and arranged that upon movement of said tongs to a position to engage a container at said predetermined position, said member will engage said actuating means to cause it to move said arm to a position in engagement with a container and thereafter to admit fluid to the interior of a container at said predetermined position.

10. Apparatus for introducing a fluid into the interior of a container, comprising means for supplying a fluid to the interior of a container through the open upper end thereof, when the container is at a predetermined position, means for removing the container from said predetermined position in a substantially vertical direction, and means mounting the first-named means so constructed and arranged as to permit of the substantially vertical movement of the container away from said predetermined position, said fluid supplying means comprising an arm extending substantially horizontally over said predetermined position, a support for said arm, and means pivotally interconnecting said arm and said support so constructed and arranged as to permit movement of said fluid supplying means upon vertical movement of said container.

11. Apparatus for introducing a fluid into the interior of a container, comprising means for supplying a fluid to the interior of a container through the open upper end thereof, when the container is at a predetermined position, means for removing the container from said predetermined position in a substantially vertical direction, and means mounting the first-named means so constructed and arranged as to permit of the substantially vertical movement of the container away from said predetermined position, said fluid supplying means comprising a laterally extending arm, a support for said arm for holding it in such position that it will extend laterally over said predetermined position of a container, means interconnecting said arm and said support constructed and arranged to permit the vertical movement of said arm about a substantially horizontal axis in respect to said support, resilient means tending to hold said arm spaced above said predetermined position of a container while permitting movement of said arm about said axis against the action of said resilient means upon vertical upward movement of a container away from said position, and means for moving a container substantially vertically away from said predetermined position.

ALGY J. SMITH.